(12) United States Patent　　(10) Patent No.: US 7,397,422 B2
Tekawy et al.　　(45) Date of Patent: Jul. 8, 2008

(54) METHOD AND SYSTEM FOR ATTITUDE DETERMINATION OF A PLATFORM USING GLOBAL NAVIGATION SATELLITE SYSTEM AND A STEERED ANTENNA

(75) Inventors: Jonathan A. Tekawy, Newport, CA (US); Raymond S. DiEsposti, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 11/533,059

(22) Filed: Sep. 19, 2006

(65) Prior Publication Data

US 2008/0068263 A1　　Mar. 20, 2008

(51) Int. Cl.
*G01S 5/14* (2006.01)
(52) U.S. Cl. .................................. 342/357.11
(58) Field of Classification Search ............ 342/357.11, 342/422, 425, 426
See application file for complete search history.

(56) References Cited

U.S. PATENT DOCUMENTS

| 4,030,099 | A | * | 6/1977 | Valenti et al. ................ 342/426 |
| 6,463,366 | B2 | | 10/2002 | Kinashi et al. |
| 6,906,664 | B2 | | 6/2005 | Tseng et al. |
| 6,930,636 | B2 | * | 8/2005 | Fowell ........................ 342/359 |

OTHER PUBLICATIONS

P.J. Buist, Full Attitude from a Single GPS Antenna: Demonstration of Concept with Orbital Data from PoSAT-1, Proceedings of the 4th International Conference on Spacecraft Guidance, Navigation, and Control Systems, Oct. 1999.*
Tekawy, J. A., "Precision Spacecraft Attitude Estimators using an Optical Payload Pointing System," AIAA Journal of Spacecraft and Rockets, vol. 35, No. 4, Jul.-Aug. 1998.
Parkinson, Bradford and Spilker, James (editors), "Global Positioning System: Theory and Applications, Attitude Determination, vol. II" pp. 519-538, AIAA Progress in Astronautics and Aeronautics, vol. 164, 1996.

* cited by examiner

*Primary Examiner*—Thomas H. Tarcza
*Assistant Examiner*—Fred H. Mull
(74) *Attorney, Agent, or Firm*—Klein, O'Neill & Singh, LLP

(57) ABSTRACT

A system and method for determining the attitude of a platform is provided. The method includes: (a) Searching and scanning for one or more GPS satellite(s) to determine initial platform position; wherein a single directionally steered antenna scans for the GPS/GNSS satellite; (b) pointing and scanning the antenna to GPS/GNSS satellite to determine a first angular measurement of a direction of a GPS/GNSS signal; (c) measuring carrier to noise ratio of the GPS/GNSS satellite; (d) dithering the single directionally steered antenna to obtain an angular measurement relative to an antenna pattern bore-sight reference; (e) repeating steps (b)-(d) to determine a second angular measurement of the direction of a second GPS signal; (f) determining the attitude error of the platform using the first and second angular measurements; (g) updating the platform position and attitude.

14 Claims, 5 Drawing Sheets

US 7,397,422 B2

METHOD AND SYSTEM FOR ATTITUDE DETERMINATION OF A PLATFORM USING GLOBAL NAVIGATION SATELLITE SYSTEM AND A STEERED ANTENNA

CROSS REFERENCE TO RELATED APPLICATIONS

None

BACKGROUND

1. Field of Invention

The present invention relates generally to attitude determination systems, and more particularly, to an attitude determination method and system using a single directionally steered antenna and Global Navigation Satellite Systems to determine the attitude of a platform vehicle.

2. Background of the Invention

An attitude determination system is used to estimate the attitude of a platform vehicle, such as a satellite, an aircraft or a ground vehicle. Typically, the attitude determination system references a platform vehicle coordinate system relative to a known reference object in space, such as the earth, the sun satellites, stars or planets, to determine the orientation of the platform relative to a second coordinate system in which in the direction to the object is known (e.g., antenna boresight). The object's known location could be in either inertial or moving reference frame coordinates. To estimate the platform's attitude in the inertial frame, the reference object location or direction in the inertial frame is used.

Conventional methods for estimating the attitude of a platform vehicle have drawbacks. One such method uses an optical payload pointing system that utilizes stars as inertial references. This method is undesirable because optical systems are expensive and require processing to generate the attitude.

Another method utilizes a Global Positioning System (GPS)/Global Navigation Satellite System (GNSS) receiver system and electro-optical sensors to make angular direction measurements to the GPS/GNSS satellites in order to provide 3-axis attitude estimates. This method is undesirable because optical systems are expensive and require processing to generate the attitude.

Yet another method utilizes phase difference information of a separated multi-patch antenna system. By measuring differential phase between two antennas, the platform vehicle attitude can be estimated. This method requires several multi-patch antennas and large antenna baselines for high precision making the system bulky and heavy. This method also suffers with cycle ambiguity resolution issues where the number of wavelengths between a given pair of antennas needs to be correctly resolved first before the attitude determination processing can start.

In view of the above, what is needed is a cost-effective attitude determination system to determine the attitude of a platform vehicle.

SUMMARY OF THE INVENTION

In one aspect of the present invention, a method for determining the attitude of a platform is provided. The method includes: (a) Searching and scanning for one or more GPS satellite(s) to determine initial platform position; wherein a single directionally steered antenna scans for the GPS/GNSS satellite; (b) pointing and scanning the antenna to GPS/GNSS satellite to determine a first angular measurement of a direction of a GPS/GNSS signal; (c) measuring carrier to noise ratio of the GPS/GNSS satellite; (d) dithering the single directionally steered antenna to obtain an angular measurement relative to antenna pattern bore-sight reference; (e) repeating steps (b)-(d) to determine a second angular measurement of the direction of a second GPS signal; (f) determining the attitude errors of the platform using the first and second angular measurements; (g) updating the platform position and attitude.

In another aspect of the present invention, a method for re-calibrating a single directionally steered antenna on a moving platform is provided. The method includes turning on a calibration mode of the single directionally steered antenna having a nominal curve; commanding a single directionally steered antenna to steer over a pre-determined angular range; obtaining carrier to noise ratio measurements at multiple angles in the pre-determined angular range; filtering the carrier to noise ratio measurements to reduce noise; generating a measured curve with the carrier to noise ratio measurements; comparing the nominal curve of the single directionally steered antenna to the measured curve; and updating the nominal curve if an error is determined between the nominal curve and the measured curve.

In yet another aspect of the present invention, a system for determining the attitude of a platform is provided. The system includes a plurality of GPS/GNSS satellites; a single directionally steered antenna on the platform for detecting a plurality of GPS/GNSS signals from the plurality of GPS/GNSS satellites; and a GPS/GNSS receiver with a processors having attitude determination capability, on the platform for converting the plurality of signals into angular measurements; wherein the angular measurements are used to determine the attitude of the platform.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of various objects of the present invention. The illustrated embodiment is intended to illustrate, but not to limit the invention. The drawings include the following.

DETAILED DESCRIPTION OF THE PREFERRED EMBODIMENTS

The following detailed description is of the best currently contemplated modes of carrying out the invention. The description is not to be taken in a limiting senses but is made merely for the purpose of illustrating the general principles of the invention, since the scope of the invention is best defined by the appended claims.

Broadly, the present invention provides a system and method for attitude determination using a single directionally steered antenna combined with a Global Positioning System (GPS) or Global Navigation Satellite System (GNSS) satellites and receiver system. The GPS/GNSS satellites' locations are known in either or both Earth Center Earth Fixed (ECEF) and Earth Center Inertial (ECI) frames which provide true references for estimating the attitude of a platform vehicle relative to either of these coordinate frames.

The vehicle platform's location is also known in either or both the ECEF or ECI coordinate system. Thus, the direction vector from the platform to each satellite can be computed in the ECEF or ECI system. Knowledge of the direction vectors in both the reference and platform coordinate systems enables estimation of the platform orientation relative to the reference system.

As the location of the platform vehicle (e.g., satellite, aircraft or ground vehicle) is known and since the location of the GPS/GNSS satellites are also known the line of sight (LOS) direction in ECEF of ECI coordinates is also known. The LOS direction to GPS/GNSS satellites 6 is also measured in the satellite body axis system with a steerable antenna beam. Measurements of two or more LOS directions in the two different coordinate systems can be processed using well-known determination algorithms to estimate the attitude of the platform relative to ECI or ECEF coordinate system.

Figure 1:
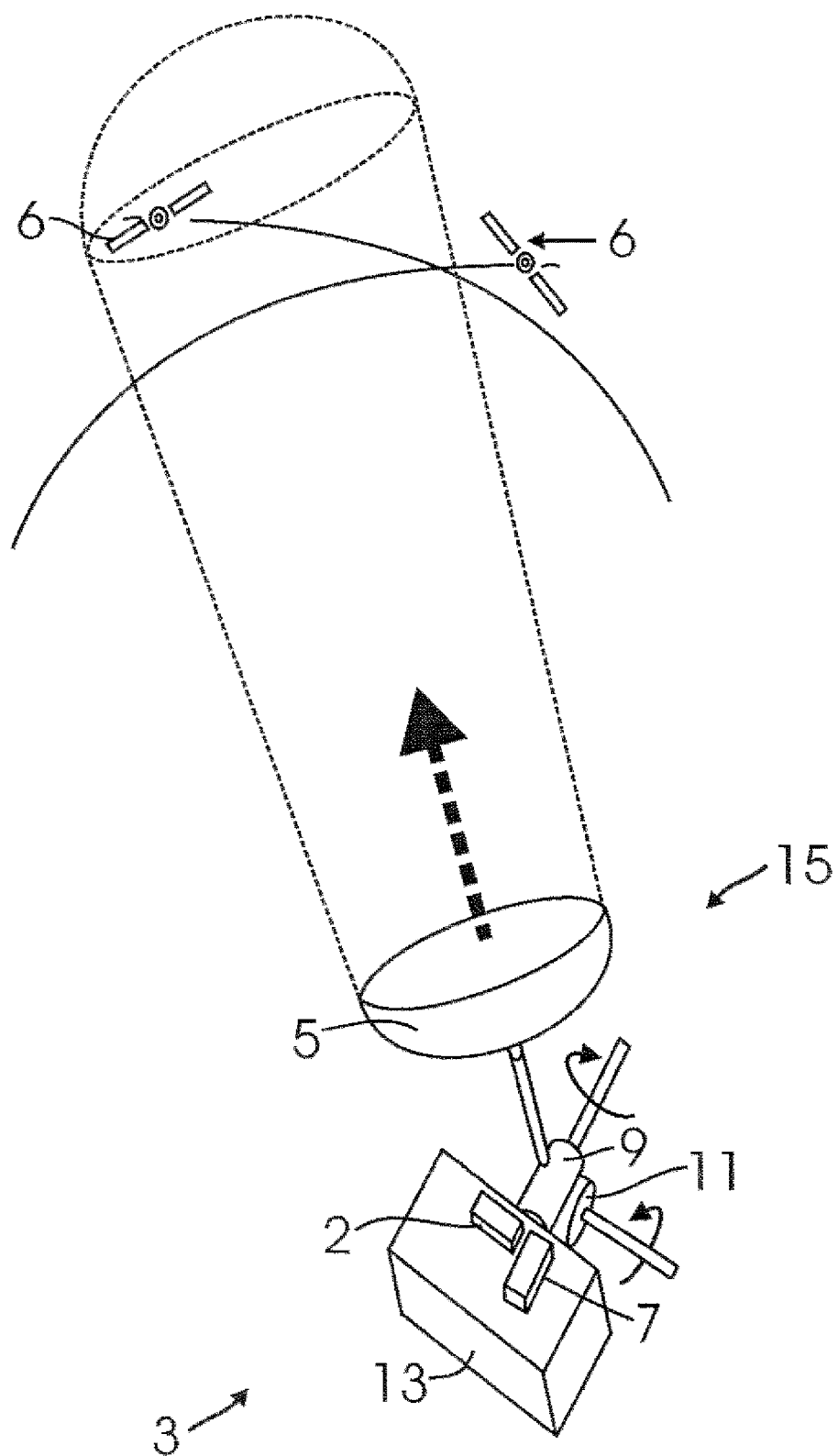
FIG. 1 illustrates an attitude determination system, according to one object of the present invention.

Turning in detail to the present invention, FIG. 1 illustrates an attitude determination system 3, according to one aspect of the present invention, for estimating the 3-axis attitude (e.g. yaw, pitch and roll) of a platform vehicle, such as a satellite, an aircraft or a ground vehicle. Attitude determination system 3 includes a platform system 15, located on the vehicle, having a GPS receiver 2, with attitude determination capability, which utilizes satellites 6 as known reference points for making angular measurements. The angular measurements are used to determine the attitude of the platform vehicle (or "platform"). Alternatively, rate sensors 7 (i.e., gyros) can be used in each axis for propagating the estimated attitude when satellites 6 are not available providing continuous attitude estimation to the platform vehicle.

To obtain the angular measurements, a single directionally steered antenna 5 is used. Single directionally steered antenna 5, located on platform system 15, replaces the optical payload pointing system and associated on-board processing for inertial referencing in conventional attitude determination systems. The star referencing function of the optical payload pointing system is replaced with a known location of GPS/GNSS satellites 6 (hereinafter referred to as "satellites" or "satellite") which are treated like "pseudo-stars" for inertial referencing. The location of the GPS/GNSS satellites 6 can be derived using the satellites ephemeris information.

Although a mechanically steered antenna is shown in FIG. 1, those skilled in the art will recognize an electronic steering directional antenna could also be used, and multiple simultaneous electronic beam architectures are possible if the steering is done within GPS/GNSS receiver 2 (hereinafter referred to as "GPS receiver" or "receiver"). Antenna 5 has a known antenna gain pattern (or "calibrated curve" or "nominal curve") as antenna 5 is calibrated on the ground using standard techniques, such as analysis or measurements on a test range.

Figure 2:
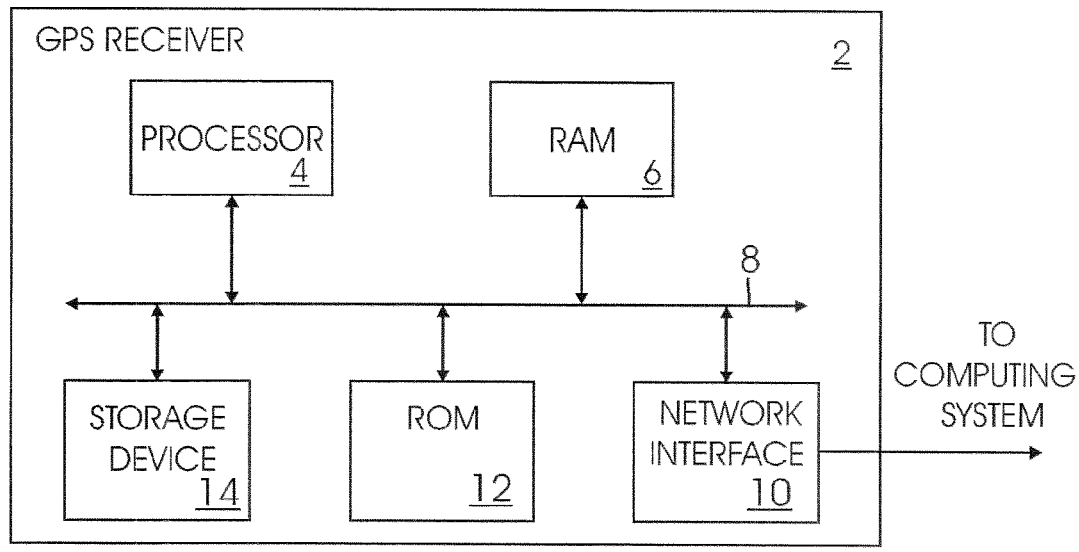
FIG. 2 illustrates a top-level block diagram of a GPS/GNSS receiver used according to one aspect of the present invention.

FIG. 2 illustrates a top-level block diagram of a GPS receiver 2 used according to one aspect of the present invention. GPS receiver 2 includes a microprocessor or processor 4 (or state machine) to execute program steps out of random access memory (RAM) 6 to determine platform attitude based on measurements described below. Read only memory (ROM) is provided to store invariant instructions or sequences or basic input/output systems (BIOS) sequences.

GPS receiver 2 includes a computer-readable memory storage device 14 for storing readable data. Storage device 14 may include a hard drive, a magnetic tape, a magnetic drum, integrated circuits, or the like, operative to hold data by any means, including magnetically, electrically optically, and the like. Storage device 14 may store operating system program files, application program files, computer-executable process steps and the processing algorithm to determine the attitude of the platform and other files.

GPS/GNSS receiver 2 can be connected to a computing system (not shown) through a network interface 10 using the computer bus 8 and a network connection (not shown). Network interface 10 may be adapted to one or more of a wide variety of networks, including local area networks, wireless networks, storage area networks, wide area networks, the Internet, and the like.

As described above, angular measurements are used to determine the attitude of the platform vehicle. Single directionally steered antenna 5 is pointed or slewed, in the azimuth (AZ) and elevation (EL) directions, to a known target direction (i.e. GPS satellites) using two gimbaled motors 9, 11. If the initial platform attitude has large uncertainty, a large angle scan mode may be necessary to acquire the initial direction measurement information. The orientation of antenna 5 relative to the satellite body axes are measured using gimbal angle sensors 9, 11. The angular direction from platform 13 to satellite 6 are measured in an antenna coordinate system, and then transformed to the platform body coordinate system using the known gimbal angle sensor data. The attitude determination function is performed by relating the angular measurements in the platform body coordinates to the known direction in ECEF or ECI coordinates.

GPS/GNSS receiver 2 tracks and records the received power level from satellite 6 on the GPS/GNSS L-band channel, relates these power measurements to the antenna gain pattern characteristics to accurately measure the angular direction, from which the attitude errors can be estimated (as described below with reference to FIG. 3). Only two satellites observations are needed to resolve all 3-axis attitude errors, however, the present invention is not limited to any particular number of measurements. Additional satellite measurements having wide geometric angular separation will improve performance.

Additionally, accurate satellites 6 information is available from GPS/GNSS receiver 2 once the GPS signals have been acquired and tracked. This includes ranging measurements to compute a platform navigation position solution and received power C/No (i.e., Carrier to Noise ratio) measurements to compute the angle off antenna bore-sight for attitude determination. Antenna pattern bore-sight is where the gain is maximum, which is nominally along the centerline of the antenna. i.e. the absolute centerline extended. Receiver 2 stores the processing algorithm that determines position and attitude at a central location in receiver 2. Alternatively, the processing algorithm can be located on the satellite Next, antenna 5 is dithered (a controlled angular motion) to produce a noticeable change in the Carrier to Noise (C/No) measurements at receiver 2 about the maximum at the antenna pattern bore-sight (described below with reference to FIG. 3). The standard carrier-to-noise (C/No) ratio associated with a received GPS signal is given by:

$$C/No = S_r + G_a - 10 \log(k\,T_o) - N_f - L$$

Where
$S_r$—received signal power
$G_a$—antenna gain towards the signal
k—Boltzman's constant
$T_o$—noise temperature
$N_f$—noise figure
L—additional losses Since the signal path loss varies with the distance to the source squared, the received signal power can vary significantly as the geometry between satellites 6 and a space borne receiver changes. For a Geosynchronous orbit satellite application, the path loss due to the additional distance and the GPS/GNSS satellite transmit antenna gain pattern roll-off cause significant reduction in the signal power, and only a few GPS/GNSS satellites are typically useable at any one time. However, using the single directionally steered antenna amplifies the gain for the weak GPS/GNSS signals as received at GEO.

Figure 3:
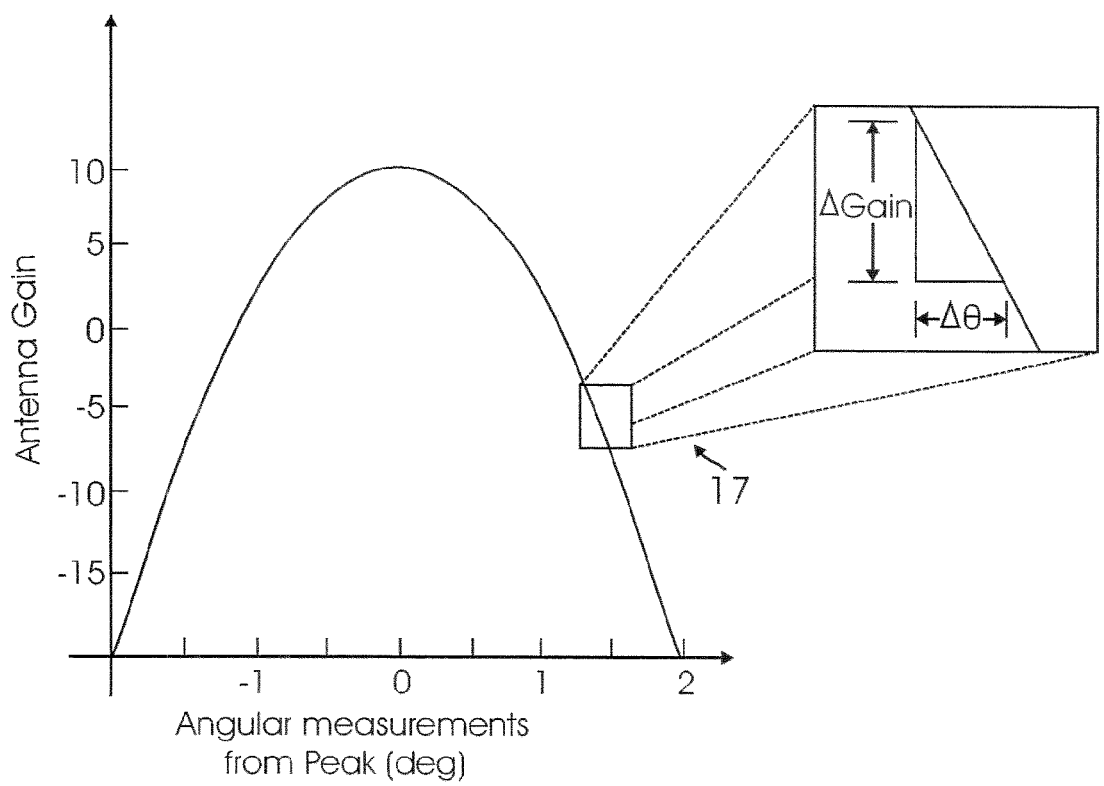
FIG. 3 is a graph of the calibrated curve of the single directionally steered antenna gain pattern of FIG. 1.

Turning to FIG. 3, a graph of the calibrated curve of antenna 5 is illustrated. The antenna gain is shown on the Y-axis and beam width is shown on the X-axis. To determine the maximum gain (or change in power or bore-sight), antenna 5 is dithered along the calibrated curve. As the curve is typically flat at the maximum gain, antenna 5 is dithered to a point on curve 17 with a slope so there is sensitivity to angular motions.

The antenna gain pattern or the nominal curve of antenna 5 is known. To convert power measurements to angular measurements, the change in measured Carrier-to-Noise (C/No) is compared to models of the calibrated antenna gain pattern roll-off vs. AZ and EL off bore-sight. Receiver 2 has enough sensitivity to measure small changes in the received power to the satellite. When receiver 2 is locked on to the reference satellite signal, it can make Carrier-to-Noise (C/No) density measurements of the received satellite power.

By dithering the antenna beam about the maximum peak power, the variation in received power can provide error signal readout along a part of the beam pattern with known power change sensitivity to locate the satellite direction to an accuracy of about one tenth of the antenna beam-width. For the electronically steered antenna, application of high-resolution direction finding algorithms can also enable enhanced direction measurement performance. Also, for multi-element electronically steered array antenna systems, multiple beams can be formed within the receiver to simultaneously process several GPS/GNSS signals.

Failing to dither antenna 5 and staying at one angular location will provide a carrier to noise ratio measurement, however, the bore-sight cannot be determined. If only one absolute carrier to noise ratio measurement is known, an angular measurement can not be obtained as there are too many unknown parameters, such as the satellite power, losses, noise figure, and noise temperature as these parameters vary over time. Usually over a short period of time, those parameters are all fixed, so the curve can shift the gain either up or down along the vertical axis, but the pattern will still remain, so by dithering, it does not matter that some of the parameters are unknown as the maximum gain is always nominally along the bore-sight.

For example, FIG. 3 shows that the maximum gain is zero, which may or may not be accurate. The actual value of the maximum gain is not important as long as the bore-sight is known so that the attitude can be calculated. In other words, the absolute power is difficult to measure, but the change in power can be easily measured by dithering. When at the bore sight, the maximum power is associated with the maximum observed C/No. When dithering, the power will go down and then back up indicating the maximum gain is located at the point that is maximum and at bore sight.

Once the bore-sight has been found, an angular measurement of the direction of the GPS/GNSS signal is known to an accuracy of about a tenth of a beamwidth. The process described above is repeated for at least one more satellite, to get another angular measurement, in order to determine or estimate 3-axis attitude, i.e. roll, pitch and yaw The attitude is calculated using algorithms well known to those skilled in the art stored in GPS/GNSS receiver 2.

Figure 4:
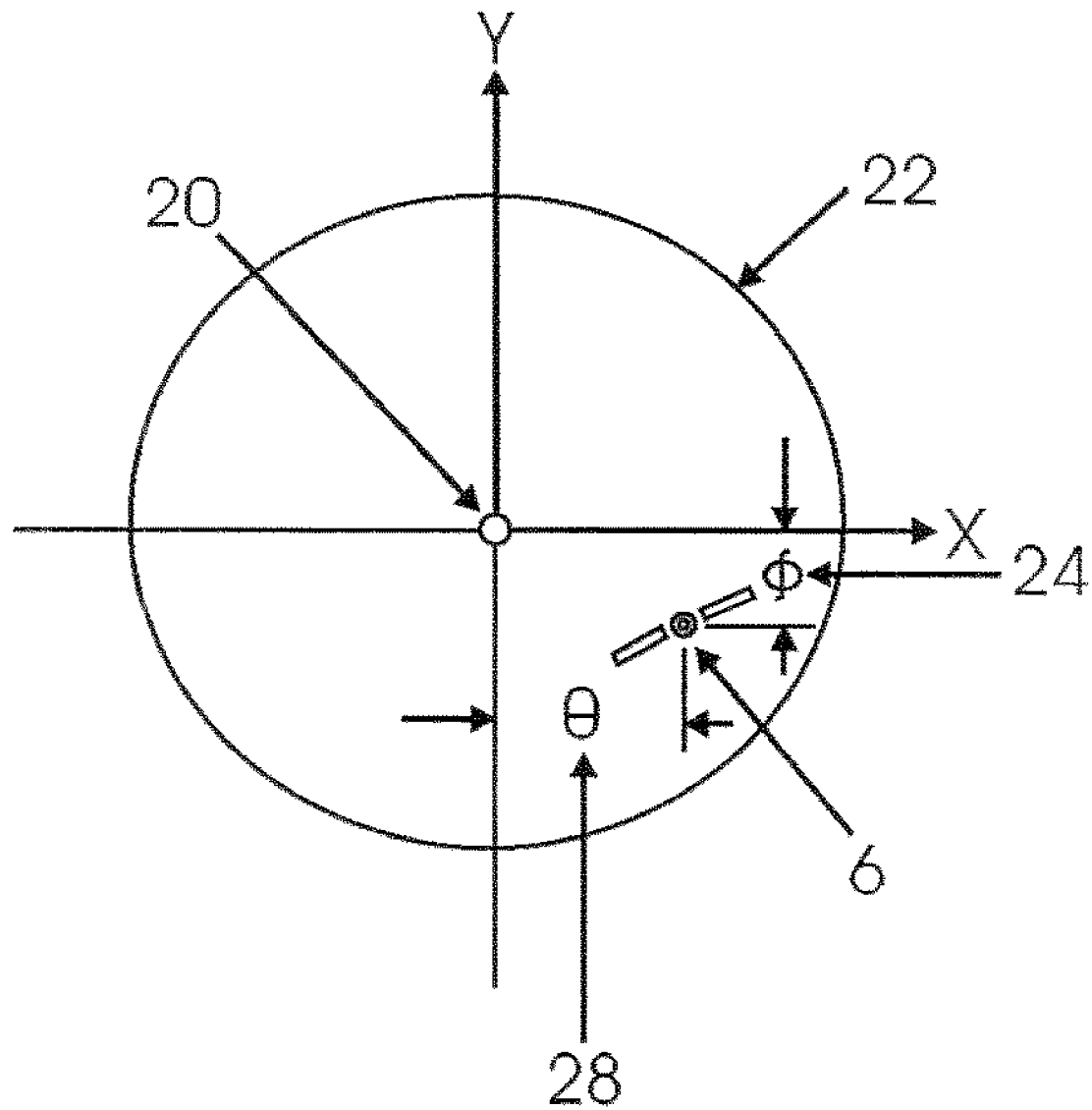
FIG. 4 illustrates new calibration errors of single directionally steered antenna of FIG. 1.

Once antenna gain curve has been calibrated, it can change over time. For example, the bore-sight gain may differ by 3 dB—a factor of two. FIG. 4 illustrates new calibration errors of antenna 5 due to change in the signal gain. The new calibration measurements (i.e., $y_{cal}$) are shown individually about the antenna bore-sight axes, roll angle about bore-sight, pitch angle about bore-sight 28 and antenna gain main lobe (−3 dB) 22. Although satellite 6 should be located at the bore-sight of antenna 5, satellite 6 is off from the bore-sight antenna 20.

The antenna 5 can be re-calibrated to update gain pattern changes over time by turning on the re-calibration mode of platform system 15. This causes antenna 5 to dither by sweeping through some angular range to collect C/No measurements at one-degree, or so, angular intervals for calibration gain measurement error processing. The difference between where the C/No peak is measured and where the antenna bore-sight 20 is pointing to, provide the attitude error measurements using calibrated beam pattern models. There will be noise on these measurements, so the measurements will be passed through a filter, such as a Kalman filter, to reduce the noise. A measured curve is generated from the measurements and the measured curve is compared to the standard curve. If any errors are detected, the standard or nominal curve is updated.

The Kalman filter is commonly used in attitude determination systems. In the present invention, the known attitude estimation equation algorithm is used except the attitude measurement errors will be obtained from the GPS/GNSS receiver, where the attitude measurements are derived from the C No received signal power measurements, antenna pointing data, and precise antenna gain pattern models vs. AZ and EL.

Figure 5:
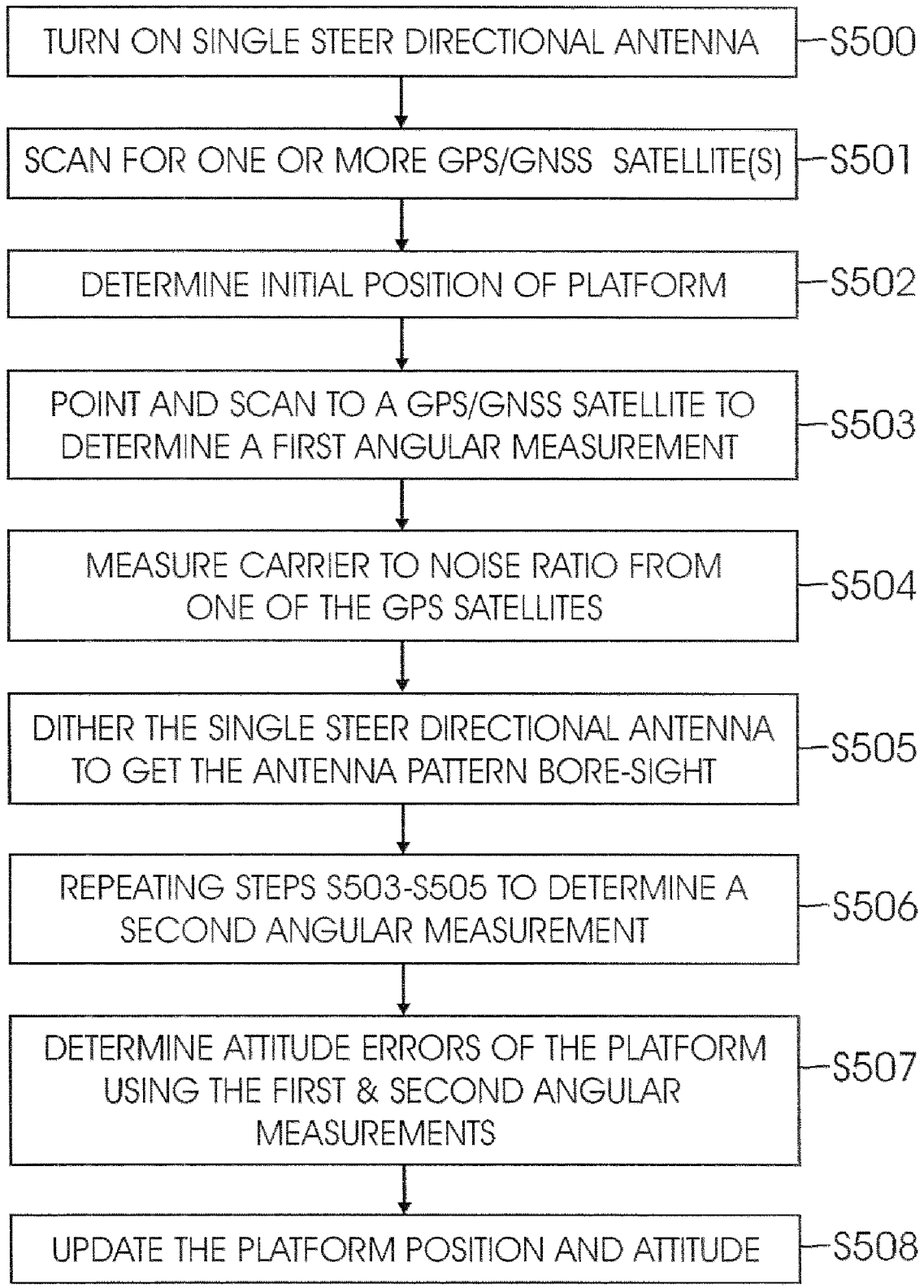
FIG. 5 is a flow chart illustrating the steps of using a directionally steered antenna and GPS/global navigation satellite system to determine the attitude of a platform vehicle, according to one aspect of the present invention.

FIG. 5 is a flow chart summarizing the steps of using a directional antenna and GPS/global navigation satellite system to determine the attitude of a platform vehicle. In step S500 single directionally steered antenna 5 is activated, scanned and commanded to point at GPS/GNSS satellites 6. If the initial platform attitude has large uncertainty, a large angle scan mode may be necessary to acquire the initial satellites and direction measurement information. In step S501, single directionally steered antenna 5 scans the sky for one or more GPS/GNSS satellites 6. In step S502, the initial position of the platform is determined. In step S503, GPS/GNSS satellite 6 is detected to determine a first angular measurement of the direction of the GPS signal. In step S504, the C/No from satellite 6 is measured. In step S505, antenna 5 is dithered to obtain the direction relative to the antenna pattern bore-sight. In step S506, steps S503-S505 are repeated to determine a second angular measurement of the direction of a second GPS/GNSS signal. In step S507, the attitude errors of the platform vehicle is determined using the first and second angular measurements. In step S508, the position and attitude of the platform vehicle is updated using new measurements.

Figure 6:
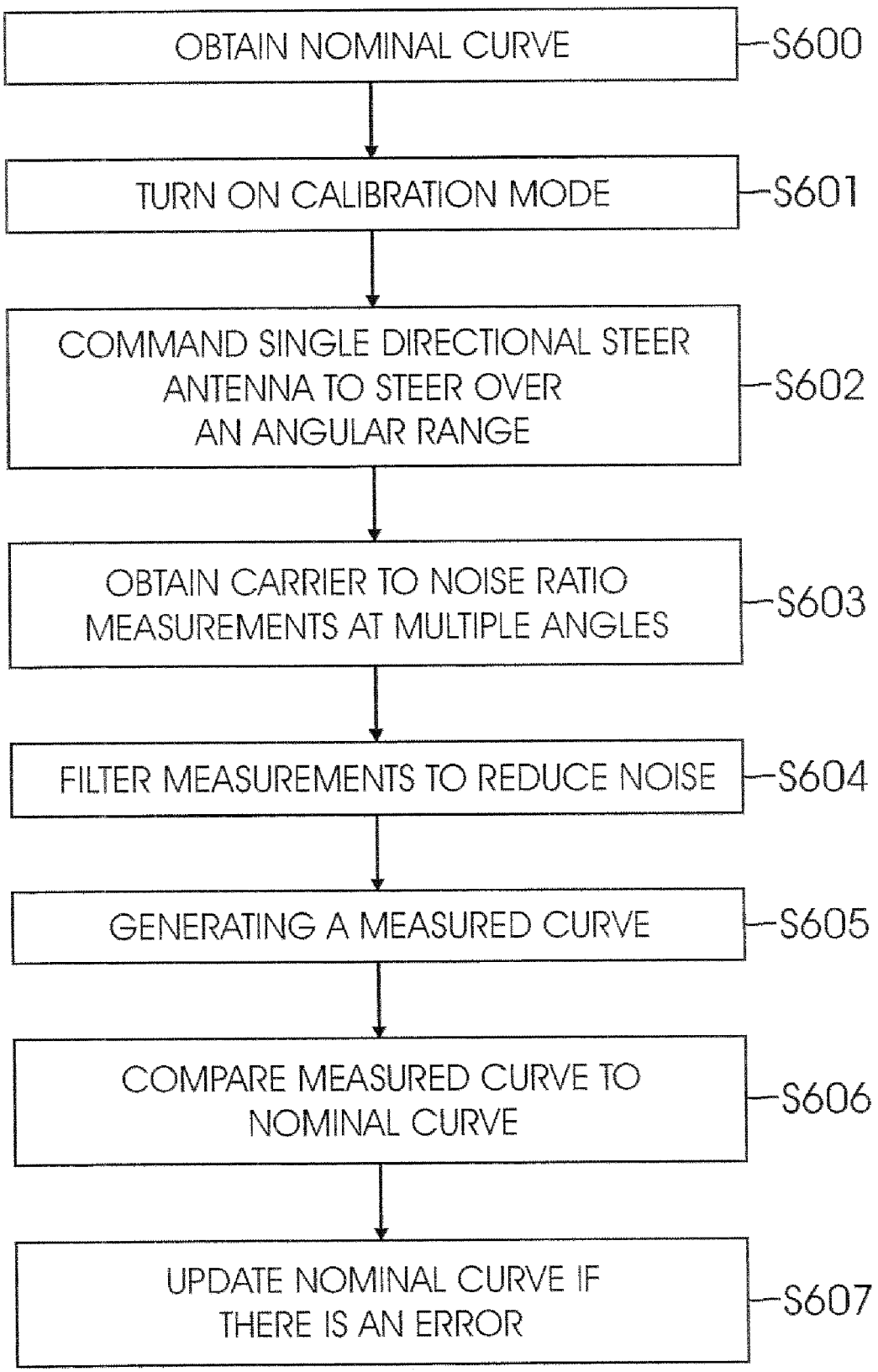
FIG. 6 is a flow chart re-calibrating a nominal curve of an antenna, according to one aspect of the present invention.

FIG. 6 is a flow chart summarizing the steps of re-calibrating a nominal curve of an antenna. In step S600, the nominal curve of antenna 5 is obtained that is created during the manufacture or test of the antenna. In step S601, a re-calibration mode of antenna 5 is turned on. In step S602, antenna 5 is commanded to steer over an angular range. In steps S603, carrier to noise ratio measurements are collected every one degree interval or so. In step S604, the measurements are filtered using a Kalman filter to reduce noise. (The use of a Kalman filter enables the calibration process even while the platform is translating and rotating by correcting for rotational and relative translational motion.) In step S605, a measured curve is generated from the measurements. In step S606, the measured curve is compared to the nominal curve to detect any errors. In step S607, the nominal curve is updated if any errors are detected.

Attitude determination system 3 of the present invention provides numerous advantages over convention attitude determination systems. It eliminates the need for an expensive optical based attitude determination system (star, earth or sun sensors), performs on-board satellite gyro calibration using unified GPS/GNSS antenna and receiver systems, and improves RF signal strength since a single directionally steered antenna can be used to enhance received satellite power by several dB. Furthermore the attitude determination system of the present invention is useful for space receivers at the GEO orbit where the GPS/GNSS signals are significantly attenuated due to the much greater path length distance to the satellites and also weak GPS/GNSS signals associated with the GPS/GNSS antenna side-lobes.

It also improves mission effectiveness in GPS/GNSS jamming environment due to the use of a single omni-directional antenna, minimizes unintentional RF interference signal as interference outside of the antenna beam-width is significant attenuated, enables an initial attitude acquisition capability in the presence of large initial attitude errors by operating the antenna and receiver system in the large angle search and scan mode to acquire and lock on to an initial navigation satellite, reduces complexity by eliminating the need to utilize multiple antennas as proposed by other GPS/GNSS based attitude determination systems, and eliminates the differential group delay time of arrival synchronization requirement associated with multiple antenna configuration approach.

Finally, attitude determination system 3 of the present invention provides a simpler and less expensive receiver design since a single channel configuration can be utilized. For position and time estimation a sequencing receiver design can be utilized along with a Kalman filter and gyro measurements to precisely propagate a satellite platform trajectory and attitude between ranging measurements. Simultaneous multiple measurement architectures are also possible with the inclusion of multiple electronic or mechanical directional beams.

While the present invention is described above with respect to what is currently considered its preferred embodiments it is to be understood that the invention is not limited to that described above. To the contrary, the invention is intended to cover various modifications and equivalent arrangements within the spirit and scope of the appended claims.

What is claimed is:

1. A method for determining the attitude of a platform, comprising:
   (a) searching and scanning for at least one GPS/GNSS satellite to determine initial platform position; wherein a single directionally steered antenna scans for the at least GPS/GNSS satellite;
   (b) pointing and scanning the single directionally steered antenna to the at least one GPS/GNSS satellite to determine a first angular measurement of a direction of a GPS/GNSS signal;
   (c) measuring carrier to noise ratio of the at least one GPS/GNSS satellite;
   (d) dithering the single directionally steered antenna to obtain an angular measurement relative to an antenna pattern bore-sight reference;
   (e) repeating steps (b)-(d) to determine a second angular measurement of the direction of a second GPS signal;
   (f) determining attitude errors of the platform using the first and second angular measurements;
   (g) updating the platform position and attitude.

2. The method of claim 1, wherein the platform is an aircraft.

3. The method of claim 1, wherein the platform is a satellite.

4. The method of claim 1, wherein the platform is a ground vehicle.

5. The method of claim 1, wherein the single directionally steered antenna is pointed in azimuth and elevation directions to the GPS/GNSS satellite using gimbaled motors.

6. The method of claim 1, wherein the single directionally steered antenna is pointed to the GPS/GNSS satellite using electronic steering.

7. The method of claim 1, wherein the single directionally steered antenna is dithered to obtain a variation in satellite signal power measurements associated with antenna gain nominal curve.

8. The method of claim 1, wherein a GPS receiver uses received power levels from the GPS/GNSS satellite to determine carrier to noise ratios.

9. The method of claim 8, wherein the GPS/GNSS receiver determines the attitude of the platform using the first and second angular measurements.

10. A system for determining the attitude of a platform, comprising:
    a plurality of GPS/GNSS satellites;
    a single directionally steered antenna on the platform for detecting a plurality of GPS/GNSS signals from the plurality of GPS satellites; and
    a GPS/GNSS receiver with a processor, having attitude determination capability, on the platform for converting the plurality of signals into angular measurements; wherein the angular measurements are used to determine the attitude of the platform.

11. The system of claim 10, wherein the single directionally steered antenna has a nominal curve.

12. The system of claim 10, wherein the GPS/GNSS receiver tracks and measures received power levels from the plurality of GPS/GNSS satellites on the L-band channel.

13. The system of claim 12, wherein the GPS/GNSS receiver relates the received power levels to the nominal curve of the single directionally steered antenna to measure angular direction of the plurality of satellites.

14. The system of claim 10, wherein the platform is an aircraft, a satellite and/or ground vehicle.

* * * * *